(12) United States Patent
Li et al.

(10) Patent No.: US 11,439,997 B2
(45) Date of Patent: Sep. 13, 2022

(54) NEUTRAL COMPLEX CLEANING SOLUTION AND REGENERATION METHOD FOR DENITRATION CATALYST WITH CALCIUM POISONING

(71) Applicant: TSINGHUA UNIVERSITY, Beijing (CN)

(72) Inventors: Junhua Li, Beijing (CN); Xiansheng Li, Beijing (CN); Xiang Li, Beijing (CN); Yue Peng, Beijing (CN); Jianjun Chen, Beijing (CN)

( * ) Notice: Subject to any disclaimer, the term of this patent is extended or adjusted under 35 U.S.C. 154(b) by 637 days.

(21) Appl. No.: 16/332,967

(22) PCT Filed: Sep. 28, 2017

(86) PCT No.: PCT/CN2017/103833
§ 371 (c)(1),
(2) Date: Mar. 13, 2019

(87) PCT Pub. No.: WO2018/214360
PCT Pub. Date: Nov. 29, 2018

(65) Prior Publication Data
US 2019/0275509 A1    Sep. 12, 2019

(30) Foreign Application Priority Data
May 24, 2017    (CN) .......................... 201710375329.X

(51) Int. Cl.
| | |
|---|---|
| *B01J 38/52* | (2006.01) |
| *B01D 53/86* | (2006.01) |
| *B01D 53/96* | (2006.01) |
| *B01J 23/30* | (2006.01) |
| *B01J 23/92* | (2006.01) |
| *B01J 38/12* | (2006.01) |

(52) U.S. Cl.
CPC .......... *B01J 38/52* (2013.01); *B01D 53/8628* (2013.01); *B01D 53/96* (2013.01); *B01J 23/30* (2013.01); *B01J 23/92* (2013.01); *B01J 38/12* (2013.01); *B01D 2255/2045* (2013.01); *B01D 2255/20707* (2013.01); *B01D 2255/20723* (2013.01); *B01D 2255/20776* (2013.01)

(58) Field of Classification Search
CPC ... B01J 38/52; B01J 23/30; B01J 23/92; B01J 38/12; B01D 53/8628; B01D 53/96; B01D 2255/2045; B01D 2255/20707; B01D 2255/20723; B01D 2255/20776
USPC ........................................................... 502/29
See application file for complete search history.

(56) References Cited

FOREIGN PATENT DOCUMENTS

| CN | 103055962 A | * | 4/2013 | ............. B01J 23/30 |
| CN | 105860949 A | * | 8/2016 | ................ B01J 1/00 |
| CN | 107159318 A | * | 9/2017 | ............. B01J 23/30 |

* cited by examiner

*Primary Examiner* — Edward M Johnson
(74) *Attorney, Agent, or Firm* — Novoclaims Patent Services LLC; Mei Lin Wong

(57) ABSTRACT

The invention belongs to the field of nitrogen oxide control in environmental protection science and technology, and particularly relates to the field of regeneration and utilization of SCR denitration catalyst with calcium poisoning, that is a neutral complex cleaning liquid and a regeneration method for denitration catalyst with calcium poisoning. The present invention uses a neutral polyether surfactant as a regeneration and calcium removal reagent to achieve a poisoned catalyst regeneration method with high calcium removal rate, low loss rate of active components and excellent recovery of denitrification activity; wherein the content of the polyether surfactant is in the range of 0.1-1 wt %; by the regeneration method of the present invention, the loading of active components which is required in the conventional regeneration process can be omitted, while the corrosion of equipment and catalyst can be reduced, thus capable of regenerating the denitration catalyst with high efficiency.

7 Claims, No Drawings

NEUTRAL COMPLEX CLEANING SOLUTION AND REGENERATION METHOD FOR DENITRATION CATALYST WITH CALCIUM POISONING

BACKGROUND OF THE PRESENT INVENTION

Field of Invention

The present invention belongs to the field of environmental protection technology and relates to nitrogen oxide control, and more particularly to a neutral complex cleaning solution and a regeneration method for denitration catalyst poisoned by calcium.

Description of Related Arts

Nitrogen oxides (NOx) emitted from coal-fired power stations, industrial furnaces, etc. are one of the main pollutants causing environmental degradation in the region, and are also important precursors for acid rain and photochemical smog. Selective catalytic reduction (SCR) is the most efficient technology for fixed source flue gas denitrification and is widely used by domestic and foreign coal-fired power plants. During the "Twelfth Five-Year Plan" period, China has carried out comprehensive NOx emission reduction projects. All the thermal power units that have been operated and newly built in China are equipped with denitrification devices, which mainly uses medium and high temperature SCR catalysts and mostly employs high dust layout process. This also leads to SCR catalysts being poisoned by the smoke and fly ash easily while carrying out high efficient denitrification. The life of general SCR catalysts is 3-5 years, and the use of inferior coal will greatly reduce the service life of the catalyst. China will steadily produce a large number of deactivated catalysts after 2018. In 2014, the Notice on Strengthening the Supervision of Waste Flue Gas Denitration Catalyst (Circular Letter 2014 [990]) listed vanadium-titanium catalyst as hazardous waste. If the waste catalyst is directly landfilled, it will cause waste of resources and environmental pollution. Catalyst regeneration can restore catalyst activity to achieve recycling of resources and has become the best waste catalyst treatment.

China's coal has a high content of calcium, and the $CaSO_4$ produced by the combination of calcium and sulfate in the fly ash deposits in the pores of the catalyst, causing calcium poisoning of the catalyst. At present, the waste catalyst with calcium poisoning is mainly washed and regenerated with dilute sulfuric acid. However, this method causes a large amount of loss of active components vanadium and tungsten, and requires an additional loading process of the active materials. Also, the use of emulsifiers and dispersants will increase the complexity and cost of the cleaning fluids. Therefore, it is necessary to develop a new and efficient regeneration method for waste catalyst with calcium poisoning which is capable of removing the poisonous element calcium and simplifying the formulation of the catalyst regeneration liquid in order to prolong the service life of the catalyst and reduce the regeneration cost.

SUMMARY OF THE PRESENT INVENTION

In order to overcome the disadvantages of the prior art described above, an object of the present invention is to provide a neutral complex cleaning solution and a regeneration method for denitration catalyst with calcium poisoning, which is capable of widely applied to denitration catalysts deactivated by alkaline earth metals such as calcium inactivation, directionally removing poisonous element calcium, and prolonging the service life of the catalyst by simple and highly efficient regeneration cleaning liquid.

In order to achieve the above object, the present invention is implemented by the following technical solutions:

A neutral complex cleaning solution for denitration catalyst with calcium poisoning, which includes an active ingredient of polyether surfactant, wherein the polyether surfactant is selected from one or a mixture of JFC-E, NP-10, EL-60 and AEO9.

The polyether surfactant has a concentration of 0.1-1 wt % and the remaining content of the neutral complex cleaning solution is deionized water.

The present invention also includes a regeneration method of denitration catalyst with calcium poisoning by using a neutral complex cleaning solution, which comprises the steps of:

Step 1: Removing impurities remaining on a surface and inside pores of a poisoned denitration catalyst and drying under room temperature, then stand-by for use;

Step 2: After drying, placing the poisoned denitration catalyst in the neutral complex cleaning solution for carrying out an ultrasonic cleaning process for 30 min-2 h and then allow it to stand for 1-24 h; and Step 3: Taking out the denitration catalyst and processing washing, air drying, heat drying, and calcination to obtain a regenerated denitration catalyst.

The ultrasonic cleaning process of the step 2, the solid to liquid ratio is 1:10-1:100, the cleaning time is 0.5-2 h, the cleaning temperature is 20° C.

In the step 3, the denitration catalyst is washed with deionized water, air dried until a water content is below 15-30%, heated dried under 80-160° C. for 12-72 hours, and the temperature is increased to 500-700° C. at a rate of 1-10° C./min and then calcination is carried out under air condition for 4-24 hours to obtain the regenerated denitration catalyst.

Compared with the existing arts, the present invention has the following advantageous technical effects:

1. The regeneration liquid of the present invention has a simple formula and is easy to operate, thus simplifying the formula of the traditional cleaning liquid while the cleaning cost is reduced.

2. The present invention has a high calcium removal rate and is particularly suitable for recycling and regeneration of denitration catalyst with high calcium poisoning.

3. The formulation of the present invention can retain most of the active components such as vanadium pentoxide, tungsten trioxide and the like while removing a large amount of calcium, and even the subsequent step of active components implantation in the conventional regeneration technique can be omitted.

DETAILED DESCRIPTION OF THE PREFERRED EMBODIMENT

The present invention is described in further detail below with reference to specific embodiments.

The catalyst used in the following embodiments are prepared in a laboratory where the mass of $V_2O_5$ (Vanadium pentoxide) is 1%, the mass of $WO_3$ (Tungsten trioxide) is 9%, the mass of CaO (Calcium oxide) is 4%, and the remaining is $TiO_2$ (Titanium dioxide).

Embodiment 1

A high-efficiency complex regeneration method for denitration catalyst with calcium poisoning, comprising the steps of:

Step 1: using compressed air to clean a deactivated catalyst with a cross-section of 150×150 mm, a number of holes of 18×18 and a length of 800 mm;

Step 2: dissolving 500 g of NP-10 (POLYETHYLENE GLYCOL TRIMETHYLNONYL ETHER, also known as OP-10, CAS number: 127087-87-0) in 100 L of deionized water and the NP-10 solution has a mass fraction of 0.5%, then placing the dried deactivated catalyst obtained from the Step 1 in the NP-10 solution for carrying out ultrasonic cleaning for 30 min and then allowing the deactivated catalyst to stand for 3 hours, and taking out and draining; and Step 3: Taking out the catalyst after Step 2, washing with deionized water for 3-4 times, air drying until a water content is below 20%, heated drying under 110° C. for 12 hours, and then increasing temperature to 500° C. at a rate of 2° C./min and carrying out calcination under air condition for 4 hours to obtain the regenerated catalyst.

Embodiment 2

A high-efficiency complex regeneration method for denitration catalyst with calcium poisoning, comprising the steps of:

Step 1: using compressed air to clean a deactivated catalyst with a cross-section of 150×150 mm, a number of holes of 18×18 and a length of 800 mm;

Step 2: dissolving 100 g of EL-60 (cremophor EL 60) in 100 L of deionized water to obtain an EL-60 solution having a mass fraction of 0.1%, then placing the dried deactivated catalyst obtained from the Step 1 in the EL-60 solution for carrying out ultrasonic cleaning for 60 min and then allowing the deactivated catalyst to stand for 3 hours, and then taking out and draining; and Step 3: Taking out the catalyst after Step 2, washing with deionized water for 3-4 times, air drying until a water content is below 15%, heated drying under 110° C. for 12 hours, and then increasing temperature to 550° C. at a rate of 5° C./min and carrying out calcination under air condition for 4 hours to obtain the regenerated catalyst.

Embodiment 3

A high-efficiency complex regeneration method for denitration catalyst with calcium poisoning, comprising the steps of:

Step 1: using compressed air to clean a deactivated catalyst with a cross-section of 150×150 mm, a number of holes of 18×18 and a length of 800 mm;

Step 2: dissolving 1000 g of AEO9 (polyethyleneglycol (9) mono-dodecyl ether) in 100 L of deionized water to obtain an AEO9 solution having a mass fraction of 1%, then placing the dried deactivated catalyst obtained from the Step 1 in the AEO9 solution for carrying out ultrasonic cleaning for 30 min and then allowing the deactivated catalyst to stand for 3 hours, and then taking out and draining; and Step 3: Taking out the catalyst after Step 2, washing with deionized water for 3-4 times, air drying until a water content is below 30%, heated drying under 110° C. for 12 hours, and then increasing temperature to 550° C. at a rate of 2° C./min and carrying out calcination under air condition for 6 hours to obtain the regenerated catalyst.

The denitration efficiency of the regenerated catalyst of Embodiments 1-3 and the spent catalyst are compared, and the Ca removal rate, the $V_2O_5$ loss rate, and the $WO_3$ loss rate are measured by ICP-OES test.

Catalyst denitration rate, Ca removal rate, $V_2O_5$ loss rate and $WO_3$ loss rate are calculated according to the following formula:

$$\text{Denitration efficiency } \eta = ([NO_x]_{in} - [NO_x]_{out}) / [NO_x]_{in} \times 100\%$$

$$\text{Ca removal rate } c = ([CaO]_{poisoned} - [CaO]_{regenerated}) / [CaO]_{poisoned} \times 100\%$$

$$V_2O_5 \text{ loss rate } v = ([V_2O_5]_{poisoned} - [V_2O_5]_{regenerated}) / [V_2O_5]_{poisoned} \times 100\%$$

$$WO_3 \text{ loss rate } w = ([WO_3]_{poisoned} - [WO_3]_{regenerated}) / [WO_3]_{poisoned} \times 100\%$$

Where: $[NO_x]_{in}$ is the NOx concentration (ppm) at the inlet of the reactor before the reaction, and $[NO_x]_{out}$ is the concentration (ppm) of the Nox in the outlet gas after the reaction. The test conditions are: temperature 350° C., atmospheric pressure, reaction space velocity 60000 h-1, catalyst input 0.2 g, flue gas concentration 500 ppm $NH_3$, 500 ppm NO, 3% $O_2$; $[CaO]_{poisoned}$ is the percentage of calcium in the poisoned catalyst (calculated as CaO) $[CaO]_{regenerated}$ is the percentage of calcium in the regenerated catalyst (calculated as CaO); $[V_2O_5]_{poisoned}$ is the percentage of vanadium oxide in the poisoned catalyst, $[V_2O_5]_{regenerated}$ is the percentage of vanadium oxide in the regenerated catalyst. $[WO_3]_{poisoned}$ is the percentage of tungsten oxide in the poisoned catalyst, and $[WO_3]_{regenerated}$ is the percentage of tungsten oxide in the regenerated catalyst.

The table below summarizes the experimental results of the above embodiments:

| Embodiment | Denitration efficiency (%) | Ca removal rate (%) | $V_2O_5$ loss rate (%) | $WO_3$ loss rate (%) |
| --- | --- | --- | --- | --- |
| 1 | 90.1 | 88.1 | 11.8 | 1.1 |
| 2 | 75.0 | 76.5 | 2.1 | 2.8 |
| 3 | 69.6 | 87.2 | 1.6 | 0.5 |

What is claimed is:

1. A regeneration method of denitration catalyst with calcium poisoning, comprising the steps of:
   (a) providing a neutral complex cleaning solution comprising active ingredients of polyether surfactant, wherein said polyether surfactant is NP-10 (POLYETHYLENE GLYCOL TRIMETHYLNONYL ETHER);
   (b) removing impurities remaining on a surface and inside pores of a poisoned denitration catalyst and drying under room temperature;
   (c) after drying, placing the poisoned denitration catalyst in the neutral complex cleaning solution for carrying out an ultrasonic cleaning process for 30 min-2 h and then allow it to stand for 1-24 h; and
   (d) after standing, taking out the denitration catalyst and processing washing, air drying, heat drying, and calcination to obtain a regenerated denitration catalyst.

2. The regeneration method of denitration catalyst with calcium poisoning according to claim 1, in the step (c), the solid to liquid ratio is 1:10-1:100, the cleaning time is 0.5-2 h, the cleaning temperature is 20° C.

3. The regeneration method of denitration catalyst with calcium poisoning according to claim 1, wherein in step (c), further comprising the substeps of: washing with deionized water, air drying until a water content is below 15-30%, heated drying under 80-160° C. for 12-72 hours, and then increasing temperature to 500-700° C. at a rate of 1-10° C./min and carrying out calcination under air condition for 4-24 hours to obtain the regenerated denitration catalyst is carried out after taking out the denitration catalyst.

4. The regeneration method of denitration catalyst with calcium poisoning according to claim 1, wherein said neutral complex cleaning solution consists of 0.1-1 wt % of polyether surfactant and deionized water.

5. A regeneration method of denitration catalyst with calcium poisoning, comprising the steps of:
   (a) providing a neutral complex cleaning solution comprising active ingredients of NP-10 (POLYETHYLENE GLYCOL TRIMETHYLNONYL ETHER) serving as a polyether surfactant; and
   (b) cleaning a poisoned denitration catalyst with calcium poisoning by using the neutral complex cleaning solution, thereby a denitration efficiency of about 90% and a calcium removal rate of about 88% is achieved while a loss of active ingredients of the poisoned denitration catalyst is minimized.

6. The regeneration method of denitration catalyst with calcium poisoning according to claim 5, wherein said neutral complex cleaning solution consists of 0.1-1 wt % of polyether surfactant and deionized water.

7. The regeneration method of denitration catalyst with calcium poisoning according to claim 6, further comprising the steps of:
   before step (b), removing impurities remaining on a surface and inside pores of the poisoned denitration catalyst and drying under room temperature until the poisoned catalyst is dried;
   in step (b), the cleaning process is an ultrasonic cleaning process which is carried out for 30 min-2 h, and
   after step (b), allowing standing time of 1-24 hours.

* * * * *